United States Patent
Rhyne

(10) Patent No.: US 10,257,344 B2
(45) Date of Patent: Apr. 9, 2019

(54) SYSTEM, DEVICE, AND METHOD FOR TRACKING AND MONITORING MOBILE PHONE USAGE WHILE OPERATING A VEHICLE IN ORDER TO DETER AND PREVENT SUCH USAGE

(71) Applicant: Stephen Rhyne, Charlotte, NC (US)

(72) Inventor: Stephen Rhyne, Charlotte, NC (US)

(73) Assignee: Stephen Rhyne, Charlotte, NC (US)

( * ) Notice: Subject to any disclaimer, the term of this patent is extended or adjusted under 35 U.S.C. 154(b) by 0 days.

(21) Appl. No.: 15/133,597

(22) Filed: Apr. 20, 2016

(65) Prior Publication Data
US 2017/0310804 A1    Oct. 26, 2017

(51) Int. Cl.
H04M 1/00    (2006.01)
H04M 1/725    (2006.01)
H04M 1/60    (2006.01)

(52) U.S. Cl.
CPC ... *H04M 1/72577* (2013.01); *H04M 1/72569* (2013.01); *H04M 1/6075* (2013.01); *H04M 1/72572* (2013.01)

(58) Field of Classification Search
CPC .............. H04W 4/005; H04W 4/008; H04W 4/02–4/046; H04W 8/18; H04W 52/28–52/288; H04W 88/02; H04W 92/08; H04W 92/10; H04W 4/38–4/48; H04W 4/00; H04M 1/6033–1/6091; H04M 1/62

See application file for complete search history.

(56) References Cited

U.S. PATENT DOCUMENTS

| | | | |
|---|---|---|---|
| 6,138,041 | A | 10/2000 | Yahia |
| 6,690,940 | B1 | 2/2004 | Brown et al. |
| 6,771,946 | B1 | 8/2004 | Oyaski |
| 7,505,784 | B2 | 3/2009 | Barbera |

(Continued)

FOREIGN PATENT DOCUMENTS

| | | |
|---|---|---|
| CN | 101507250 A | 8/2009 |
| JP | 2000349895 A | 12/2000 |

OTHER PUBLICATIONS

Simons and Chabris, A Simple Solution for Distracted Driving, Newspaper, Oct. 30, 2015, The Wall Street Journal, United States.

(Continued)

*Primary Examiner* — San Htun
(74) *Attorney, Agent, or Firm* — K&L Gates LLP

(57) ABSTRACT

A system, device, and method for tracking and monitoring mobile phone usage while operating a vehicle in order to deter and prevent such usage are disclosed. The system comprises a device that engages with a vehicle and an application on a mobile phone to monitor the phone's usage in a vehicle and to prevent certain functions of the phone while the vehicle is being operated. The device may also record information about the different states of the device, such as the number of times and length of time the device is in each state, as well as the count and time that an audible and/or visual alarm is on, which data is transmitted to the mobile phone application. The device, in combination with the mobile phone application, may record information about certain behaviors the user engages in on the mobile phone while operating a vehicle.

21 Claims, 10 Drawing Sheets

(56) References Cited

U.S. PATENT DOCUMENTS

| | | | |
|---|---|---|---|
| 7,555,378 | B2 | 6/2009 | Larschan et al. |
| 7,697,917 | B2 | 4/2010 | Camp, Jr. et al. |
| 8,036,839 | B2* | 10/2011 | Machiyama ........ B60L 11/1861 |
| | | | 320/136 |
| 8,204,649 | B2 | 6/2012 | Zhou et al. |
| 8,270,933 | B2 | 9/2012 | Riemer et al. |
| 8,280,438 | B2 | 10/2012 | Barbera |
| 8,527,013 | B2 | 9/2013 | Guba et al. |
| 8,626,121 | B2 | 1/2014 | Poranen |
| 8,761,821 | B2 | 6/2014 | Tibbitts et al. |
| 8,774,842 | B2 | 7/2014 | Jones et al. |
| 8,787,936 | B2 | 7/2014 | Tibbitts et al. |
| 8,880,047 | B2 | 11/2014 | Konicek et al. |
| 8,884,750 | B2 | 11/2014 | Bacal |
| 8,971,927 | B2 | 3/2015 | Zhou et al. |
| 9,094,533 | B2 | 7/2015 | Geyer et al. |
| 9,185,526 | B2 | 11/2015 | Guba et al. |
| 2001/0050614 | A1 | 12/2001 | Yang |
| 2003/0096593 | A1 | 5/2003 | Naboulsi |
| 2004/0178896 | A1* | 9/2004 | Miller ................... B60R 16/023 |
| | | | 340/441 |
| 2005/0255874 | A1 | 11/2005 | Stewart-Baxter et al. |
| 2006/0148490 | A1 | 7/2006 | Bates et al. |
| 2006/0286930 | A1 | 12/2006 | Rathus et al. |
| 2007/0072616 | A1 | 3/2007 | Irani |
| 2008/0262670 | A1* | 10/2008 | McClellan ............. G01S 5/0027 |
| | | | 701/31.4 |
| 2009/0002147 | A1 | 1/2009 | Bloebaum et al. |
| 2009/0029675 | A1 | 1/2009 | Steinmetz et al. |
| 2009/0085728 | A1 | 4/2009 | Catten et al. |
| 2009/0128286 | A1 | 5/2009 | Vitito |
| 2009/0221279 | A1* | 9/2009 | Rutledge ........... H04M 1/72577 |
| | | | 455/418 |
| 2010/0087137 | A1 | 4/2010 | Fischer et al. |
| 2010/0216509 | A1* | 8/2010 | Riemer ............. H04M 1/72577 |
| | | | 455/557 |
| 2011/0082621 | A1* | 4/2011 | Berkobin ............ B60L 11/1824 |
| | | | 701/31.4 |
| 2011/0093161 | A1* | 4/2011 | Zhou .................... B60W 50/08 |
| | | | 701/31.4 |
| 2011/0153367 | A1 | 6/2011 | Amigo et al. |
| 2011/0294520 | A1* | 12/2011 | Zhou .................... H04W 48/04 |
| | | | 455/456.1 |
| 2012/0214408 | A1 | 8/2012 | Chronister |
| 2012/0268235 | A1 | 10/2012 | Fariborz et al. |
| 2013/0084847 | A1 | 4/2013 | Tibbitts et al. |
| 2013/0157640 | A1 | 6/2013 | Aycock |
| 2013/0303143 | A1 | 11/2013 | Schrader et al. |
| 2015/0054934 | A1 | 2/2015 | Haley et al. |
| 2016/0288744 | A1* | 10/2016 | Rutherford .............. B60L 1/00 |
| 2017/0303185 | A1* | 10/2017 | Nathan .................. G08B 21/18 |

OTHER PUBLICATIONS

Lyden, 6 Mobile Applications to Prevent Distracted Driving Accidents, Magazine, Aug. 2011, Automotive Fleet, United States.

Swanson, Can Technology Prevent Teen Distracted Driving?, Website, Oct. 9, 2013, Updated Jan. 9, 2015, Edmunds.com, United States.

FCC's Distracted Driving Information Clearinghouse, Distracted Driving Information Clearinghouse, Federal Government Website, Updated Dec. 7, 2015, Federal Communications Commission, United States.

Lavallee, Firms Racing to End Texting and Driving, Newspaper, Aug. 26, 2009, The Wall Street Journal, United States.

Coxworth, cellCONTROL keeps mobile phones from working in moving cars, Web Article, Jan. 1, 2012, http://gizmag.com/scosche-cellcontrol-disables-mobile-phones/21192/, United States.

Halverson, Device Disables Car to Prevent Driver from Texting, Web Article, http://mashable.com/2013/-3/15/device-disables-car-to-prevent-driver-from-texting/, Mar. 15, 2013, United States.

* cited by examiner

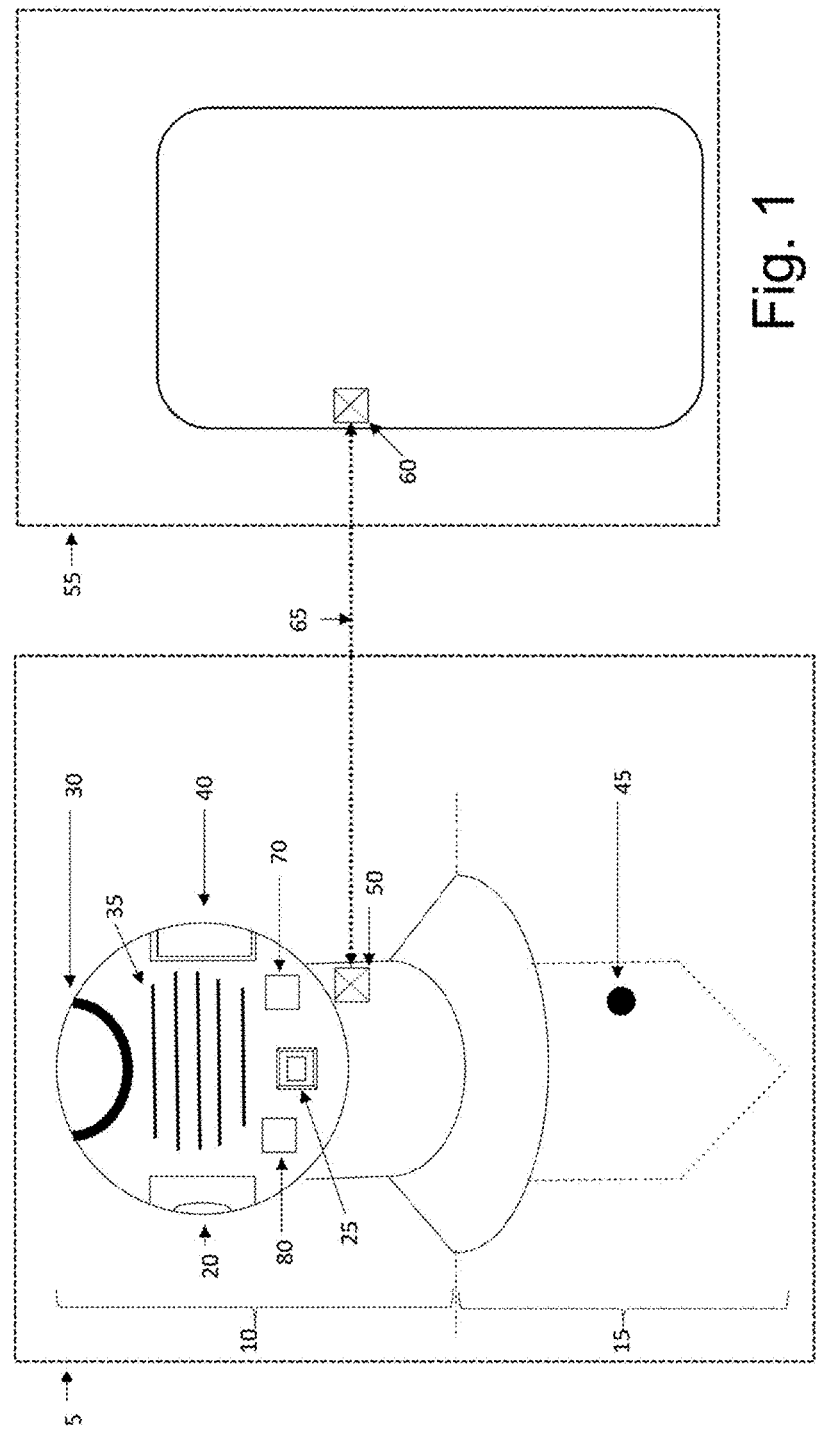

Fig. 2

View of User for a Week

[ Limited Use – With Telephone ]

[ Monitor ]    [ Steve - Admin ]

[ David - User ]

6 Months: 4,191

Week: 144

| Date | On Mins | Connected # / Mins | Off # / Mins | Disengaged # / Mins | Alarm # / Mins | Telephone Call # / Mins | Text # | Email # / Mins | Prohibited Apps # / Mins | Other Infractions # / Pts | Points |
|---|---|---|---|---|---|---|---|---|---|---|---|
| Last 7 Days | 9,875 | 54 / 417 | | 5 / 205 | 4 / 15 | 5 / 47 | 2 | 3 / 5 | 3 / 8 | 1 / -25 | 144 |
| Tuesday, March 31, 2015 | 1,320 | 3 / 60 | | 2 / 120 | 1 / 5 | 1 / 8 | 1 | | 2 / 3 | | .97 |
| Monday, March 30, 2015 | 1,440 | 6 / 45 | | | | 2 / 22 | | 3 / 5 | | 1 / -25 | 38 |
| Sunday, March 29, 2015 | 1,405 | 8 / 43 | | 1 / 35 | | | | | | | 44 |
| Saturday, March 28, 2015 | 1,440 | 8 / 87 | | | 2 / 7 | 1 / 14 | | | | | 31 |
| Friday, March 27, 2015 | 1,415 | 5 / 23 | | 1 / 25 | | | 1 | | | | 21 |
| Thursday, March 26, 2015 | 1,440 | 14 / 94 | | | | 1 / 3 | | | 1 / 5 | | 86 |
| Wednesday, March 25, 2015 | 1,415 | 10 / 65 | | 1 / 25 | 1 / 3 | | | | | | 21 |

Fig. 3

View of User for a Day

Steve - Admin

6 Months: 4,191

Week: 144

Limited Use – With Telephone

Monitor

David - User

| Date | On Mins | Connected # / Mins | Off # / Mins | Disengaged # / Mins | Alarm # / Mins | Telephone Call # / Mins | Text # | Email # / Mins | Prohibited Apps # / Mins | Other Infractions # / Pts | Points |
|---|---|---|---|---|---|---|---|---|---|---|---|
| Tuesday, March 31, 2015 | 1,320 | 3 / 60 | | 2 / 120 | 1 / 5 | 1 / 8 | 1 | 0 / 0 | 2 / 3 | 0 / 0 | -97 |
| 3:45 PM | | 1 / 30 | | | | 1 / 8 | | | | | |
| 2:15 PM | | | | 1 / 90 | 1 / 5 | | | | | | |
| 1:00 PM | | 1 / 20 | | 1 / 30 | | | | | | | |
| 12:30 PM | | | | | | | 1 | 1 | 2 / 3 | | |
| 11:15 AM | | 1 / 10 | | | | | | | | | |

Fig. 4

View of all Users in the Group

Limited Use – With Telephone

Monitor

David - User

Group: Family – Rhyne

| Last 7 Days | On Mins | Connected # / Mins | Off # / Mins | Disengaged # / Mins | Alarm # / Mins | Telephone Call # / Mins | Text # | Email # / Mins | Prohibited Apps # / Mins | Other Infractions # / Pts | Points |
|---|---|---|---|---|---|---|---|---|---|---|---|
| Steve | 9,120 | 66 / 541 | 3 / 960 | | 2 / 7 | | | | | | 578 |
| David | 9,875 | 54 / 417 | | 5 / 205 | 4 / 15 | 5 / 47 | 2 | 3 / 5 | 3 / 8 | 1 / -25 | 144 |
| Stephen | 10,080 | 66 / 541 | | | | | | | | | 700 |
| Jane | 10,080 | 50 / 320 | | | | | | | | | 700 |

Fig. 5

View of User for a Week

Limited Use – No Telephone

Prevent

Steve - User

6 Months: 15,237

Week: 578

| Date | On Mins | Connected # / Mins | Off # / Mins | Disengaged # / Mins | Alarm # / Mins | Telephone Call # / Mins | Text # | Email # / Mins | Prohibited Apps # / Mins | Other Infractions # / Pts | Points |
|---|---|---|---|---|---|---|---|---|---|---|---|
| Last 7 Days | 9,120 | 66 / 541 | 3 / 960 | | 2 / 7 | | | | | | 578 |
| Tuesday, March 31, 2015 | 840 | 8 / 43 | 2 / 600 | | 1 / 3 | | | | | | 33 |
| Monday, March 30, 2015 | 1,440 | 6 / 45 | | | | | | | | | 100 |
| Sunday, March 29, 2015 | 1,440 | 10 / 122 | | | | | | | | | 100 |
| Saturday, March 28, 2015 | 1,080 | 8 / 87 | 1 / 360 | | 1 / 4 | | | | | | 75 |
| Friday, March 27, 2015 | 1,440 | 8 / 65 | | | | | | | | | 70 |
| Thursday, March 26, 2015 | 1,440 | 14 / 94 | | | | | | | | | 100 |
| Wednesday, March 25, 2015 | 1,440 | 12 / 85 | | | | | | | | | 100 |

Fig. 9

| | User Profile: Selecting Features |
|---|---|
| While stopped | All phone functionality works below 2 mph |
| | While Moving |
| Speed Check / Speed Threshold (e.g., 15 mph) | Admin or User determines if Full cell phone functionality is allowed under the Speed Threshold. The cell phone functionality will become disabled once hitting the Speed Threshold. Ability of User to initiate a Speed Check, which uses the mobile phone's GPS to determine if the mobile phone is at a speed below the Speed Threshold. If the User initiates a Speed Check and the mobile phone's GPS determines the mobile phone is below the Speed Threshold, then the full functionality of the phone works until the mobile phone's GPS determines the phone is above the Speed Threshold, at which time there is once again reduced functionality of the mobile phone. |
| Mobile Phone Sensor Technology | Admin or User determines if Full cell phone functionality is allowed when the mobile phone is Not In Motion through using the mobile phone's sensor technology. The cell phone functionality will become disabled once the mobile phone is In Motion. |
| Texting | Admin or User determines if texting is Allowed or Not Allowed when under Speed Threshold/when In Motion. No texting usage after hitting Speed Threshold/when In Motion. Admin or User can enable automatic-response text back that driving. |
| Telephone Usage | Admin or User determines if telephone usage is allowed. Admin or user can enable automatic-response via phone message that driving. |
| Email | Admin or User determines if emailing is Allowed or Not Allowed when under Speed Threshold/when In Motion. No emailing usage after hitting Speed Threshold/when In Motion. Admin or User can enable automatic-response email back that driving. |
| Apps | Admin or User determines which applications can run in background. |

Fig. 10

|  | User Profile: No Use | User Profile: Limited Use – No Telephone | User Profile: Limited Use – With Telephone |
|---|---|---|---|
| While stopped | All phone functionality works below 2 mph | All phone functionality works below 2 mph | All phone functionality works below 2 mph |
|  | While Moving | While Moving | While Moving |
| Speed Check / Speed Threshold (e.g., 15 mph) | N/A | Full cell phone functionality is allowed under the Speed Threshold. The cell phone functionality will become disabled once hitting the Speed Threshold. Ability of User to initiate a Speed Check, which uses the mobile phone's GPS to determine if the mobile phone is at a speed below the Speed Threshold. If the User initiates a Speed Check and the mobile phone's GPS determines the mobile phone is below the Speed Threshold, then the full functionality of the phone works until the mobile phone's GPS determines the phone is above the Speed Threshold, at which time there is once again reduced functionality of the mobile phone. | Full cell phone functionality is allowed under the Speed Threshold. The cell phone functionality will become disabled once hitting the Speed Threshold. Ability of User to initiate a Speed Check, which uses the mobile phone's GPS to determine if the mobile phone is at a speed below the Speed Threshold. If the User initiates a Speed Check and the mobile phone's GPS determines the mobile phone is below the Speed Threshold, then the full functionality of the phone works until the mobile phone's GPS determines the phone is above the Speed Threshold, at which time there is once again reduced functionality of the mobile phone. |
| Mobile Phone Sensor Technology | N/A | Admin or User determines if Full cell phone functionality is allowed when the mobile phone is Not In Motion through using the mobile phone's sensor technology. The cell phone functionality will become disabled once the mobile phone is In Motion. | Admin or User determines if Full cell phone functionality is allowed when the mobile phone is Not In Motion through using the mobile phone's sensor technology. The cell phone functionality will become disabled once the mobile phone is In Motion. |
| Texting | Not Allowed. Can enable automatic-response text back that driving. | Allowed under Speed Threshold/Not In Motion. No texting usage after hitting Speed Threshold/when In Motion. Can enable automatic-response text back that driving. | Allowed under Speed Threshold/Not In Motion. No texting usage after hitting Speed Threshold/when In Motion. Can enable automatic-response text back that driving. |
| Telephone Usage | Not Allowed. Can enable automatic-response phone message that driving. | Not Allowed. Can enable automatic-response phone message that driving. | Allowed. Can enable automatic-response via phone message that driving. |
| Email | Not Allowed. Can enable automatic-response email back that driving. | Allowed under Speed Threshold/Not In Motion. No emailing usage after hitting Speed Threshold/when In Motion. Can enable automatic-response email back that driving. | Allowed under Speed Threshold/Not In Motion. No emailing usage after hitting Speed Threshold/when In Motion. Can enable automatic-response email back that driving. |
| Apps | A few select applications, such as a mapping application or a music application, can run in background. | All apps allowed under Speed Threshold/Not In Motion. A few select applications, such as a mapping application or a music application, can run in background above the Speed Threshold/when In Motion. | All apps allowed under Speed Threshold/Not In Motion. A few select applications, such as a mapping application or a music application, can run in background above the Speed Threshold/when In Motion. |

SYSTEM, DEVICE, AND METHOD FOR TRACKING AND MONITORING MOBILE PHONE USAGE WHILE OPERATING A VEHICLE IN ORDER TO DETER AND PREVENT SUCH USAGE

CROSS REFERENCE TO RELATED APPLICATIONS

This application claims the benefit under 35 U.S.C. § 119(e) of U.S. Provisional Patent Application No. 62/154,342, entitled "System, Device, and Method for Tracking and Monitoring Mobile Phone Usage While Operating a Vehicle in Order to Deter and Prevent Such Usage," filed Apr. 29, 2015, which is incorporated herein by reference, in its entirety.

FIELD OF THE INVENTION

The present invention relates generally to systems, devices, and methods for tracking and monitoring mobile phone usage while operating a vehicle in order to deter and prevent such usage, and more particularly to a device and method operative to track and monitor the usage of a mobile phone in a vehicle and to monitor and/or interfere with certain functions of the mobile phone while the vehicle is being operated.

BACKGROUND OF THE INVENTION

Usage of mobile phones while driving is known to be a cause or a contributing factor in automobile crashes and fatalities. Numerous states and municipalities have enacted laws banning or restricting the use of mobile phones while driving. However, these laws are often ignored and driver mobile phone distraction continues to be a significant, and perhaps increasing, public safety concern.

As used herein, the term "mobile phone" includes any type of mobile device, communication device or other computing device usable by the driver of a vehicle, including but not limited to cellular phones, smart phones, tablets, laptop computers, electronic reading devices, multimedia equipment, and any comparable device that would or could be used by a driver while operating a vehicle.

As used herein, the term "vehicle" includes any type of vehicle or automobile that can be used to transport people or goods from one location to another location, including but not limited to cars, trucks, commercial trucks, recreational vehicles, buses, commercial heavy duty equipment (e.g., earth moving equipment), military vehicles, electric bicycles, motorcycles, ships, boats, jet skis, trains, trams, hot air balloons, helicopters, planes, and any comparable type of vehicle that presents a risk if the operator is distracted while operating the vehicle.

Employers whose employees' duties include driving have a strong interest in knowing that those employees are driving safely. This includes a desire to limit or prevent mobile phone use and to know whether the employees are in fact following all relevant regulations. Parents of young drivers have similar interests, wanting to know that their children are not using a mobile phone while driving and particularly are not texting. In addition, certain other individuals may be concerned about their own personal use of a mobile phone (or the mobile phone use of others) while operating a vehicle and want a device to help limit their use of the mobile phones while driving. Some groups, such as carpools, have interests in monitoring and knowing group members' level of mobile phone use while they are driving. Insurance carriers also have an interest in reducing or monitoring distracted driving as distracted driving is a contributor to many car crashes. Supporters of campaigns or pledges (such as a pledge at work not to engage in distracted driving) also have an interest in reducing distracted driving for those who have pledged not to engage in such activities. Groups of these types and others composed of employees, insured drivers, family members or friends, for example, could form to apply social or peer pressure to promote safe driving by limiting mobile phone usage while driving based on recorded data about mobile phone usage while driving.

There are existing technologies that have been proposed and developed to prevent drivers from using mobile phones while driving. These are in two general categories: (i) embedded electronic or mechanical devices installed in a vehicle, generally in the onboard diagnostics port, or (ii) mobile phone applications that sense motion of the mobile phone.

The devices of the first category, embedded electronic or mechanical devices installed in a vehicle, are typically installed into the onboard diagnostics port (generally, the OBD II for vehicles manufactured after 1996) of the vehicle and then wireless communications between the detector and the mobile phone disable use of either the mobile phone or the vehicle. There are several inherent disadvantages to these devices, as they are relatively expensive, often result in significant drain of the vehicle's battery or a battery installed in the device, often require complex or professional installation, and allow for the onboard diagnostic port to be solely used for the given technology (e.g., insurance carriers have onboard diagnostic port devices to measure driver's behavior, such as aggressive driving tendencies, and thus only one individual device can utilize the onboard diagnostic port). In particular, in certain configurations, such a device's use of the onboard diagnostic port while the vehicle is parked, especially if parked for an extended period, significantly drains the vehicle's battery as the electronic detectors are constantly utilizing the vehicle's sensors to determine the state of the vehicle. The devices of this first category are often used to detect the ongoing speed of the vehicle through constant monitoring, while the device described herein is monitoring to determine when the vehicle is turned on and when the vehicle is turned off, similar to a binary measure. A further disadvantage of the type of embedded device discussed above is that many individuals in the general public are not familiar with the onboard diagnostic port or how to use this port in a vehicle; consequently, there is a diminished likelihood that users will install and comply with these types of devices.

The OBD II is the vehicle's on-board computer(s) and port that are monitoring all the subsystems of a vehicle, providing real-time data and diagnostic trouble codes (this is the same port used by technicians to obtain diagnostic trouble codes when the "check engine" light is on). U.S. federal law mandates that every car manufactured after 1996 include an OBD II. The live data available from the OBD II can include numerous vehicle measurements and characteristics, such as vehicle speed (MPH), engine revolutions per minute (RPM), absolute throttle position, and accelerator pedal position. The OBD II relies on data from numerous sensors contained within the vehicle to monitor the vehicle. The OBD II allows compatible devices the ability to obtain this data from the vehicle when it is being driven or is parked, and this data can be extrapolated to determine various aspects of driving habits and behaviors. There can be significant battery drain from using data from the OBD II, as the OBD II monitors many systems in a vehicle.

Existing applications in the second category, mobile phone applications that sense motion of the phone, also suffer from several limitations. The sensing technologies rely on motion of the mobile phone to detect that the phone's user is driving; however, the mere fact that the mobile phone is moving at the rate of speed of a vehicle does not indicate that the user is driving. The user could, for example, be on public transportation or be a passenger in another driver's vehicle. In order to be effective, these mobile phone applications must disable certain mobile phone functionality any time the mobile phone is moving at a high rate of speed, but this obviously includes many situations in which the user is not driving.

Accordingly, there is a need for a method of tracking and monitoring mobile phone usage while driving to prevent and deter such usage that is relatively inexpensive, does not require complex installation, does not significantly drain the vehicle's battery, is simple to use, uses a port currently available in the vehicle that the general public readily knows how to use, and provides transparency as to whether a user is actually using a mobile phone while driving. In contrast to the OBD II monitoring devices and mobile phone applications described, the present invention uses a vehicle accessory port, such as a typical 12-volt DC vehicle receptacle (receptacle generally associated with a cigarette lighter) or a USB input port, as the access point for a vehicle monitoring device, which has several inherent advantages. First, using the vehicle accessory port is a process that is well-known by drivers, as numerous typical electronic devices (such as USB chargers, phone chargers, and music players) utilize this port. Second, the vehicle accessory port is readily available and easily accessible in the vehicle, requiring only the simple installation process of the user placing the device in the vehicle accessory port. Third, the vehicle accessory port is a dedicated space within the vehicle, inherently designed to provide close and easy access to the user. Fourth, use of the vehicle accessory port will not jeopardize a vehicle's warranty. Fifth, the typical position of the vehicle accessory port allows the device to be placed in a space where signals, such as sound and light, generated by the device can be readily heard or seen by the driver. Sixth, use of a device in the vehicle accessory port results in significantly less battery drain than an OBD II device; thus, the device described herein will work in a vehicle that is not being driven daily (e.g., a vehicle that may sometimes be parked for several days) for a substantially longer period because of its significantly lower power demand than that of an OBD II device. The inventions described herein addresses the above needs, as well as providing additional features and applications, as will become readily apparent to one of ordinary skill in the art.

SUMMARY OF THE INVENTION

The present invention relates generally to systems, devices, and methods for tracking and monitoring mobile phone usage while operating a vehicle in order to deter and prevent such usage. The system, device, and method are operative to monitor the usage of a mobile phone in a vehicle and to prevent and/or interfere with certain functions of the mobile phone while the vehicle is being operated. The device is capable of logging and storing information on the device about the number of times and minutes that the device is in different states, which information is transmitted to the application on the mobile phone. The device, in combination with the mobile phone application, is capable of logging and storing information on the device and/or mobile phone application about certain behaviors the user engages in on the mobile phone while operating a vehicle. The device is capable of triggering an audible alarm and/or visual alarm when the user is not complying with certain prescribed protocols, including not connecting the device and the mobile phone application when the vehicle is turned on, exiting the mobile phone application while driving, stopping the connection between the mobile phone application and the device while driving, putting the mobile phone application in the background of the mobile phone while driving, and/or engaging in certain prohibited mobile phone functions while driving.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 1 is a perspective view of the overall system and the device of the present invention.

FIG. 2 is a graphical illustration of a computer screen showing the user records of the mobile phone application as seen by an administrator or user for a 7 day or 1 week period, wherein the user's mobile phone application is configured to monitor mobile phone usage. The computer screen may be on different types of devices such as mobile phones, tablets, and personal computers.

FIG. 3 is a graphical illustration of a computer screen showing the user records of the mobile phone application as seen by an administrator or user for a 1 day period, wherein the user's mobile phone application is configured to monitor mobile phone usage. The computer screen may be on different types of devices such as mobile phones, tablets, and personal computers.

FIG. 4 is a graphical illustration of a computer screen showing the user records of the mobile phone application as seen by an administrator or user for a 7 day period for a group of users. The computer screen may be on different types of devices such as mobile phones, tablets, and personal computers.

FIG. 5 is a graphical illustration of a computer screen showing the user records of the mobile phone application as seen by an administrator or user for a 7 day or 1 week period, wherein with the user's mobile phone application is configured to prevent mobile phone usage. The computer screen may be on different types of devices such as mobile phones, tablets, and personal computers.

FIG. 9 is an illustrative chart of potential features available to limit or prevent mobile phone functionality that an administrator or user can choose from in a user's profile. This chart is not meant to limit the design or provide an exhaustive list of functionality.

FIG. 10 is an illustrative chart of potential pre-defined profiles available to limit or prevent mobile phone functionality that an administrator or user can choose from in a user's profile. This chart is not intended to limit the design, pre-defined profiles available, or provide an exhaustive list of functionality.

DETAILED DESCRIPTION OF THE INVENTION

Figure 6:
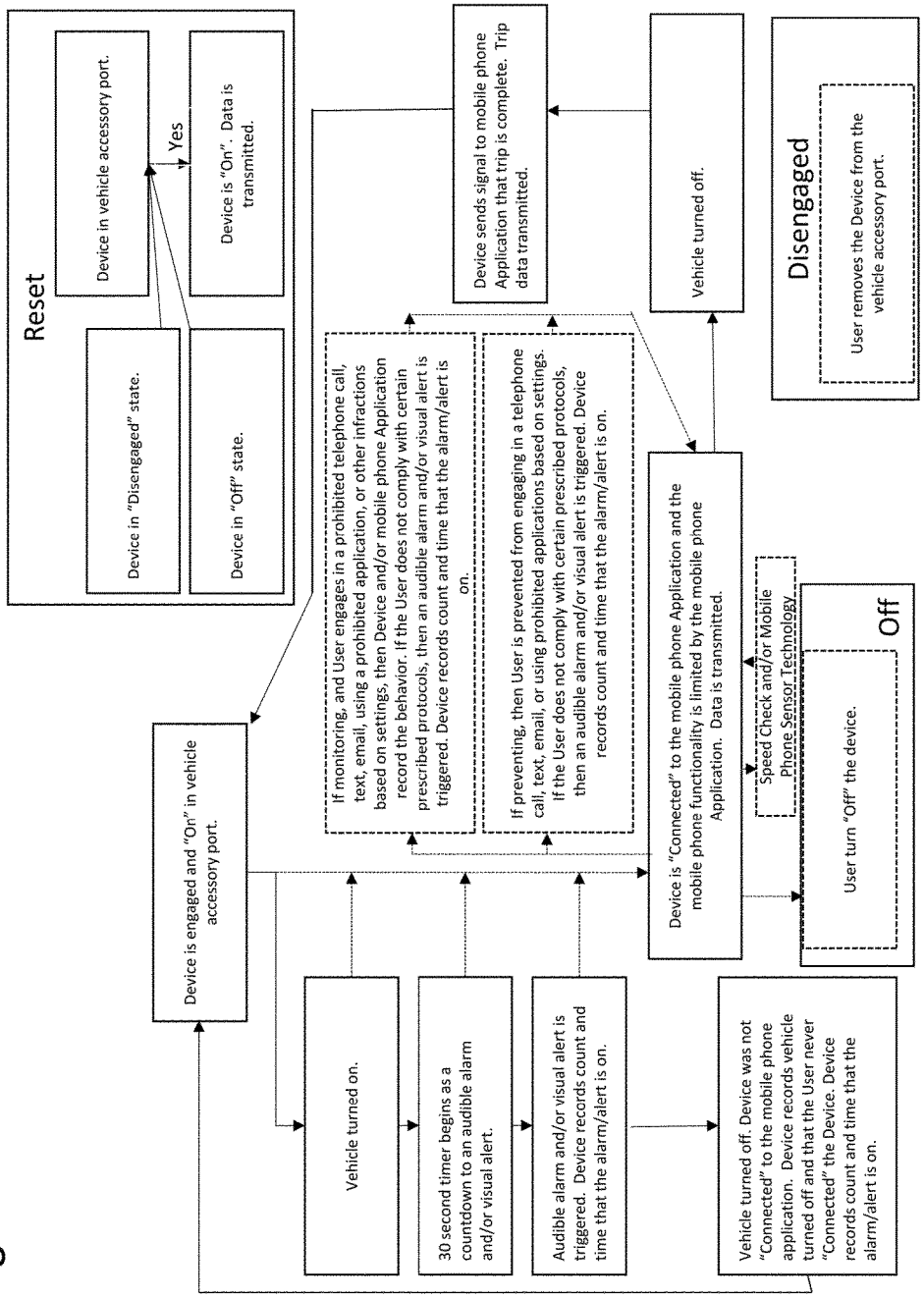
FIG. 6 is a flow chart illustrating the determination of the state of the device and the operation of the status indicator light. The flow chart is an exemplifying, non-limiting determination of the state of the device and the corresponding operation of the status indicator light.

The following detailed description of the embodiments is merely exemplary in nature and is in no way intended to limit the invention, its application, or its uses.

In an aspect of the present invention, a system and method are provided for tracking and monitoring mobile phone usage while a user is operating a vehicle in order to deter and prevent such usage. The device and method are operative to monitor the usage of a mobile phone in a vehicle and to prevent and/or interfere with certain functions of the mobile phone while the user is operating a vehicle. The device is also configured to communicate with the mobile phone through a short range wireless communication protocol. Such a short range wireless communication protocol can be used to limit the amount of battery power needed for communication between the device and the mobile phone. The device is configured to determine the vehicle state, which includes when the vehicle turns on and when the vehicle turns off, by: (i) measuring a change in the voltage output from the vehicle's battery, (ii) using one or more accelerometers to detect vibrations of vehicle components, and/or (iii) using the strength of the signal from the short range wireless communication protocol to determine the position of the mobile phone relative to the device. In each of these methods, the component of the device that is used to determine the vehicle state, i.e., the voltmeter, accelerometer, and/or the signal from the short range wireless communication protocol, is a "vehicle state sensor". As used herein, the term "vehicle state sensor" refers to the foregoing or to any other component of the device that is capable of detecting a characteristic of the vehicle that may be used to determine the vehicle state.

As used herein, the term "short range wireless communication protocol" includes any type of short range wireless communication protocol that allows communication or the exchange of data or information between electronic devices, including but not limited to ANT+, Bluetooth, Bluetooth Low Energy, Cellular, IEEE 802.15.4, IEEE 802.22 (Wireless Regional Area Network), ISA 100a, Infrared (IrDA), ISM band, Near-field communications (NFC), Radio-frequency identification (RFID), 6LoWPAN, Ultra Wideband (UWB), Wi-Fi, Wireless Body Area Networks (WBAN), Wireless Personal Area Networks (WPAN), Wireless Hart, WirelessHD, WirelessUSB, ZibBee, Z-Wave, and any comparable communication protocol that would allow communication between two electronic devices in proximity of one another.

In another aspect of the invention, when the device and the mobile phone application are connected, a software application on the mobile phone is used to monitor, control, and prevent usage of certain features of the mobile phone while the user is driving. When the mobile phone application is connected with the device, the mobile phone may have reduced functionality, as may be determined by an administrator or user through the user's profile by selecting to disable certain available features or through a pre-defined user profile in the mobile phone application's settings, such as limiting or preventing all text messaging, limiting or preventing the use of email, limiting or preventing the use of certain applications, and limiting or preventing the use of telephone calls. When the mobile phone application is connected with the device, the mobile phone application will also monitor the mobile phone for such functionality as telephone calling, texting, emailing, using certain prohibited applications on the mobile phone, and/or other infractions, and will store such information on the mobile phone application and/or transmit the data to the device. Certain mobile phone operating systems may allow a user or administrator to monitor mobile phone usage and/or prevent mobile phone usage, while certain other mobile phone operating systems, however, may only allow a user or administrator to monitor mobile phone usage, but not to prevent mobile phone usage, due to the security settings of the mobile phone operating system. The present invention, in its various embodiments, is advantageously configured to operate within the restrictions of any type of mobile phone operating system.

Referring to the figures, FIG. 1 is an overall diagram of the system of the present invention. The device 5 is configured for engagement with a vehicle accessory port. As used herein, the term "vehicle accessory port" includes any type of accessory port in a vehicle, except the OBD II or similar access points to the computer of the vehicle, so long as the vehicle accessory port receives electricity directly or indirectly from the battery of the vehicle, including but not limited to a typical 12-volt DC vehicle receptacle (receptacle generally associated with a cigarette lighter), a USB input port, and any comparable ports in a vehicle that can receive power directly or indirectly from the battery of the vehicle. The device 5 includes a housing having a base region 10 and a port region 15. The device 5 includes a power source 20, an integrated microchip 25, and a wireless transmitter/receiver 50. A status indicator light 30, a speaker 35, and an optional auxiliary port 40 are disposed on a top surface of the base region 10. The device 5 can be ergonomically designed for ease of insertion and removal from the vehicle accessory port. The port region 15 is configured for engaging the vehicle accessory port and includes a sensor 45 disposed along a length of the side of the port region 15 for determining whether the device 5 is engaged with the vehicle accessory port. Such a sensor 45 is necessary for determining if the device is removed from the vehicle accessory port. The device also includes a voltmeter 70 that can measure the change in voltage output by the vehicle battery when the vehicle is turned on and when the vehicle is turned off. As used herein, the term "voltmeter" includes any type of voltmeter, meter, or instrument that can be used to measure electricity (e.g., volts (V, voltage), current (I, amperes), and/or resistance (R, ohms)), including but not limited to a voltmeter, voltage meter, multimeter, analog meter, wattmeter, ohmmeter, ammeter, or any similar instruments. The device may optionally further include an accelerometer 80 that can be utilized to determine the vibrations generated by various components of the vehicle when the vehicle is turned on and the lack of or reduced vibrations when the vehicle is turned off. As used herein, the term "accelerometer" includes any type of accelerometer, vibration sensor, or instrument that can be used to measure acceleration, vibration, or movement, including but not limited to an accelerometer, gyroscope, magnetometer, or any similar instruments.

The power source 20 functions to power various components of the device 5, including the status indicator light 30, and may be any known type of portable power source, for example, a lithium ion battery. The sensor 45 can be powered by the power source 20 when the vehicle is off. The power source 20 is also used to power the microchip 25. The microchip 25 may optionally be configured to store data related to the count and time of the device in each of various states, the count and time that the audible alarm and/or visual alarm is on, as well as telephone calling, texting, emailing, using certain prohibited applications on the mobile phone, and/or other infractions, as further described herein. The components of the device can receive power from either the battery of the vehicle or the power source 20 in the device. The power source 20 is necessary to power these components when the device does not have power from the vehicle or when the power is more appropriately provided by the power source 20 of the device. The remaining electrical components of the device 5 function primarily when the device is engaged with the vehicle accessory port and may thus be powered either through the vehicle accessory port to reduce drain on the power source 20 of the device, or by the power source 20 of the device.

The optional auxiliary port 40 may be any type of known port capable of being powered through a vehicle accessory port, such as a USB port that can be used for powering other auxiliary devices.

The integrated microchip 25 of the device 5 controls the functions of other components of the device 5, including the wireless transmitter/receiver 50, the status indicator light 30, the speaker 35, the sensor 45, the voltmeter 70, and the accelerometer 80. The sensor 45 operates to detect whether the device is engaged with the vehicle accessory port by being inside such vehicle accessory port. The wireless transmitter/receiver 50 communicates with a corresponding wireless receiver/transmitter 60 integrated within the mobile phone 55 of the user. As indicated above, as used herein, the term "mobile phone" includes any type of mobile device, communication device or other computing device usable by the driver of a vehicle, including but not limited to cellular phones, smart phones, tablets, laptop computers, electronic reading devices, multimedia equipment, and any comparable device that would or could be used by a driver while operating a vehicle. The wireless connection between the wireless transmitter/receiver 50 and the wireless receiver/transmitter 60 can be any short range wireless communication protocol 65.

In another aspect, the system of the invention for monitoring and preventing mobile phone use in a vehicle requires a mobile phone application to be installed on the user's mobile phone 55. The mobile phone application provides the functionality needed to interpret the short range wireless communication protocol 65 signals from the device 5 and to control various functions of the mobile phone 55, as further detailed herein. The mobile phone application is capable of transmitting data via the mobile phone's wireless receiver/transmitter 60 to the device's wireless transmitter/receiver 50 about the user's telephone calling, texting, emailing, using certain prohibited applications on the mobile phone, and/or other infractions while the user was operating a vehicle. In certain embodiments, the user interface on the mobile phone application may be navigated without the user needing to look at the user interface, by using a simple menu and voice command functionality.

Once the mobile phone 55 is within the physical range for establishing a short range wireless communication protocol 65 connection to the device 5, the mobile phone application may automatically sense the presence of the device and may automatically connect to the device. Sensing the presence of the device, connection with the device, or both sensing the presence of and connection with the device can occur before the vehicle turns on, for example when the user is getting in the vehicle, or these steps can occur after the vehicle turns on.

In certain embodiments, after the mobile phone application senses the presence of the device 5, the user can activate the mobile phone application by actively engaging through the user interface on the mobile phone. In one embodiment, through its connection with the vehicle accessory port, the device 5 uses the voltmeter 70 to sense when the vehicle is turned on by detecting changes in voltage output from the vehicle's battery. In another embodiment of the invention, the accelerometer 80 is used to determine if the vehicle is turned on by detecting vibrations of the vehicle's components.

Figure 7:
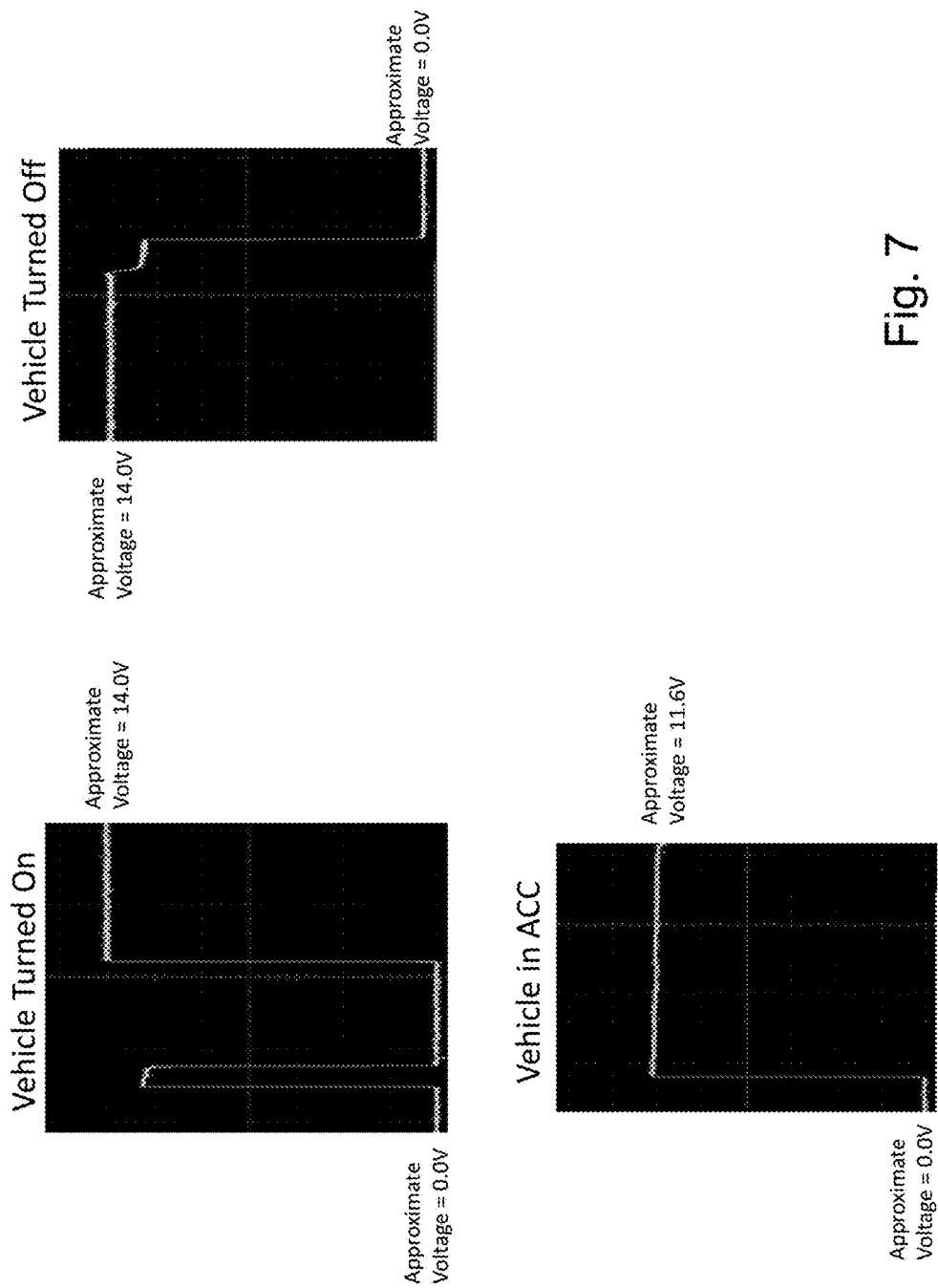
FIG. 7 is a graphical illustration of the voltage patterns exhibited by a vehicle when the vehicle turns on, when the vehicle turns off, and when the vehicle is put in ACC (accessory mode) for a vehicle that does not have voltage output when the vehicle is off. The voltage pattern illustrated in the figure is not meant to demonstrate the voltage patterns for every vehicle, nor limit the application of how to read the voltage patterns when the vehicle is turned on or turned off.
Figure 8:
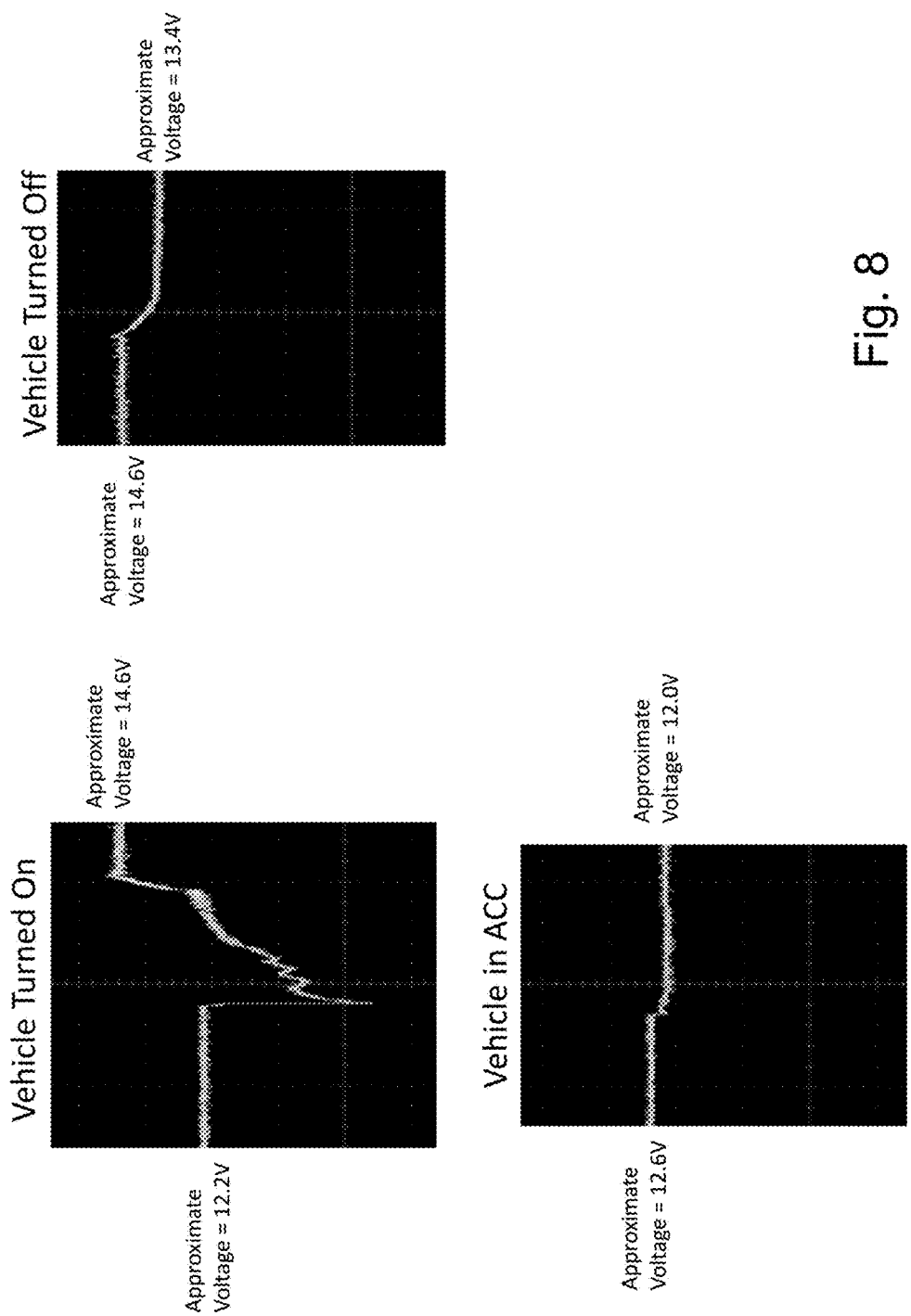
FIG. 8 is a graphical illustration of the voltage patterns exhibited by a vehicle when the vehicle turns on, when the vehicle turns off, and when the vehicle is put in ACC (accessory mode) for a vehicle having voltage output when the vehicle is off. The voltage pattern illustration in the figure is not meant to demonstrate the voltage patterns for every vehicle, nor limit the application of how to read the voltage patterns when the vehicle is turned on or turned off.

FIGS. 7 and 8 show illustrative examples of the voltage changes of a vehicle's battery when the vehicle is turned on. Vehicles are generally one of two types: i) having measurable voltage output to the vehicle accessory port when the vehicle is turned off or ii) having zero voltage output to the vehicle accessory port when the vehicle is turned off. FIG. 7 is a graphical illustration of the voltage patterns exhibited by a battery, in a variety of vehicle states, for a vehicle that does not output voltage when the vehicle is off, and includes a graphical illustration of voltage patterns exhibited when the vehicle is turned on, when the vehicle is turned off, and when the vehicle is put in ACC (accessory mode). FIG. 8 is a graphical illustration of the voltage exhibited by a battery, in a variety of vehicle states, for a vehicle that does output voltage when the vehicle is off, and includes a graphical illustration of voltage patterns exhibited when the vehicle is turned on, when the vehicle is turned off, and when the vehicle is put in ACC (accessory mode). These voltage patterns illustrated in the figures are not intended to demonstrate the voltage patterns for every vehicle nor to limit the application of how to read the voltage patterns of a vehicle's battery when the vehicle is turned on or turned off. A functioning vehicle battery generally maintains a voltage of approximately 12.0-12.6 volts when the vehicle is off. As described above, depending on the vehicle's make, the vehicle accessory port may or may not receive power from the vehicle's battery when the vehicle is off. Then, a vehicle's battery voltage increases to approximately 13.5-14.6 volts when the vehicle is turned on, as the engine turns the alternator, which in turn supplies electricity to the battery in order to charge the vehicle battery while driving; while the vehicle is on, a voltage regulator maintains the 13.5-14.6 volts in the vehicle's circuit so that the vehicle's electrical components are not damaged. When the vehicle is put in ACC (accessory) mode, then a voltage change can be measured; while a vehicle is in the ACC (accessory) mode, the device will generally treat the vehicle as being turned off. When a vehicle is turned off, a decrease in the battery voltage occurs; thus, similar voltage changes can be detected when the vehicle is turned off.

In one embodiment of the invention, the device measures the voltage change of the vehicle's battery based on the voltage output to the vehicle accessory port. A voltage change over a certain threshold, such as 0.1 volts, indicates that the vehicle is turned on. In another embodiment of the invention, the voltage change of the vehicle's battery is used to determine if the vehicle is turned on, but first the device and the mobile phone application run a diagnostic program to determine voltage changes detectable in the vehicle accessory port of a particular vehicle. These voltage patterns could be a signature voltage print for the make and model of the vehicle or a signature voltage print of a particular vehicle with unique characteristics. This diagnostic program could be used when voltage changes are more difficult to discern, for example, when there are significant ambient temperature differences experienced by the vehicle, when the vehicle has a poorly functioning battery, when the vehicle has a poorly functioning voltage regulator, in hybrid vehicles, in electric vehicles, in eco-smart vehicles, or when the vehicle has a poorly functioning alternator. The voltage of a vehicle battery can vary based on the ambient temperature outside the vehicle; with all other factors being equal, higher ambient temperatures will result in a higher voltage while lower ambient temperatures will result in a lower voltage. In FIG. 7, starting of the vehicle, turning the vehicle from off to on, is shown when the voltage increases from 0.0 volts to 14.0 volts. In FIG. 8, starting of the vehicle, turning the vehicle from off to on, is shown when the voltage increases from 12.2 volts to 14.6 volts.

A corresponding voltage decrease can be detected and used to determine when the vehicle is turned from on to off. As shown in FIG. 7, when the vehicle is turned from on to off, the voltage declines from approximately 14.0 volts to 0.0 volts as the vehicle accessory port is no longer receiving electricity from the vehicle's battery. As shown in FIG. 8, when the vehicle is turned from on to off, then the voltage declines from approximately 14.6 volts to 13.4 volts, as the alternator is no longer supplying electricity to the battery in order to charge the vehicle battery while driving.

In one embodiment of the invention, the device attempts to detect a voltage change of the vehicle's battery only when the battery voltage is above a certain threshold, for example 11.7 volts. If the battery voltage decreases below this threshold, then the continuing operation of the device could result in the vehicle's battery potentially being drained to a level below what is needed to start the engine of the vehicle. This is an example of a safety kill switch to stop complete drainage of the vehicle's battery by the device and to prevent the engine from not starting due to too low of a charge left in the vehicle's battery.

In another embodiment of the invention, as an alternative or in addition to detecting the voltage output through the vehicle accessory port, the device could be directly connected to any electrical circuitry in the vehicle (e.g., the wiring harness or secondary wires in a vehicle). The purpose of this direct connection to the existing circuit would be to measure the voltage change when the vehicle is turned on or when the vehicle is turned off.

In another embodiment of the invention, the device 5 will utilize an accelerometer to detect vibrations generated by various components of the vehicle when the vehicle is turned on. When a vehicle is turned on, many components of the vehicle vibrate as they receive electricity from the battery, and these vibrations can be detected by an accelerometer 80. Since the accelerometer 80 can be a component of the device 5 in the vehicle accessory port, the accelerometer is in close proximity to many of the components of a vehicle that vibrate when they receive electricity. Thus, the device 5 is particularly well located in the vehicle to detect vibrations. By detecting these vibrations through the accelerometer 80, then the device 5 will determine when the vehicle is turned on through the vibrations caused by components of the vehicle receiving electricity. Similarly, the accelerometer 80 may be used to detect decreased vibrations of vehicle components to determine when the vehicle is turned off. Additionally, the accelerometer 80 could be used to measure if a vehicle is in motion.

In some embodiments, a combination of the voltage change method described and the accelerometer method described are used to determine the vehicle state. The ability to use a combination of the voltage change method described and the accelerometer method described to determine the vehicle state also has broader application outside of the present invention and other devices directed toward the problem of distracted driving, such as for dashboard cameras/video recorders on a vehicle's windshield, or any other electronic device for which it would be advantageous to determine when a vehicle is turned on and when a vehicle is turned off.

The device 5 registers the event of the vehicle turning on through the voltmeter 70 measuring the voltage change of the vehicle's battery and/or the accelerometer 80 detecting vibrations of the vehicle's components, and initiates a timer. The user must activate and connect the mobile phone application to the device 5 within a defined time frame, for example thirty seconds, after the vehicle is turned on. If the user does not connect the mobile phone application within that time frame, an audible alarm and/or visual alarm is triggered and output through the speaker 35 and/or the status indicator light 30, respectively. The audible alarm and/or visual alarm will continue either until the user activates the mobile phone application and connects to the device 5 or until a defined time limit for the alarm is reached. This audible alarm and/or visual alarm can be thought of as a similar to the alarm process commonly triggered in a vehicle when a driver does not buckle his or her seatbelt while driving. This audible alarm and/or visual alarm for a seatbelt is generally understood within the vehicle market, and as such, the device 5 uses a well understood audible alarm and/or visual alarm mechanism to alert drivers of the need to connect the device 5 with the mobile phone application. If the defined time limit is reached, the device 5 can log that the user initiated a trip without connecting the mobile phone application and device 5 or that the user initiated a trip, but exited the mobile phone application. The device 5 may also log the total amount of time and number of times that an alarm has been active for a particular user.

In certain embodiments, a similar audible alarm and/or visual alarm can be used when the user does not comply with certain prescribed protocols, including by not connecting the device and the mobile phone application when the vehicle turns on, exiting the mobile phone application while driving, stopping the connection between the mobile phone application and the device while driving, putting the mobile phone application in the background of the mobile phone, and/or engaging in certain prohibited mobile phone functions while driving. The device is capable of counting the number of times a certain prescribed protocol violation occurs and/or the number of minutes for which the prescribed protocol violation occurs. In certain embodiments, the volume, duration and frequency of the beeps of the audible alarm can be adjusted by the user or administrator, as well as having the option to increase the volume and/or frequency of the audible alarm after it is triggered. For example, the audible alarm may go from a softer audible alarm that beeps every few seconds to a louder audible alarm that beeps more rapidly. In certain embodiments, the audible alarm and/or the frequency and duration of visual alarm frequency output can vary based on what prescribed protocols are violated. If, for example, the user fails to connect the device and the mobile phone application when the vehicle turns on, an alarm and/or visual alarm initially could trigger merely to remind the user to return to connect the device and the mobile phone application; however, the frequency of the alarms and the volume of the audible alarm could increase thereafter to serve as an encouragement, not merely as a reminder, to connect the device and the mobile phone application. Other examples where the audible and visual alarms could apply in this manner include: the user exiting the mobile phone application while driving, the user disconnecting the mobile phone application and the device while driving, the user putting the mobile phone application in the background of the mobile phone, and/or the user engaging in certain behavior on the mobile phone while driving. In some embodiments, for example, the user engaging in certain behavior on the mobile phone while driving could include an audible alarm and/or visual alarm each time the user engages in telephone calling, texting, emailing, using certain prohibited applications on the mobile phone, and/or other infractions to serve as a reminder or encouragement not to engage in such behavior. Alternatively, the audible alarm and/or visual alarm for telephone calling, texting, emailing, and/or using certain prohibited applications on the mobile phone may only occur after a certain amount of time or after a certain amount of consecutive times that the user engages in that functionality on the mobile phone. In certain embodiments, for example, the user engaging in certain behavior on the mobile phone while driving could include if the mobile phone is above the speed threshold or in motion and the user has not returned to the mobile phone application. In certain embodiments, a user or administrator may select not to use the audible and/or visual alarm once the device and the mobile phone application are connected.

In some embodiments, the device will have a unique number associated with it. The mobile phone application may use this unique number to log which device the user connects with the user's mobile phone. The device will also log a unique identifier for the user's mobile phone to determine which mobile phones have connected with a particular device. Moreover, the device can also be limited to only accept the unique identifier for the mobile phone of the user. This functionality is intended to ensure that the mobile phone of the driver is connecting with the appropriate device.

Once the mobile phone application and device have been connected, the mobile phone application may i) monitor which mobile phone functions are performed by the user and/or ii) prevent the user from performing prohibited functions on the mobile phone. These monitored and/or prohibited functions may be selectively defined by an administrator or user and may include, for example, limiting or preventing telephone calls, texting, emailing, and/or any other specific functions or applications on the mobile phone. The administrator may select when to receive notifications about the user, such as if the user violates certain protocols, if the user engages in telephone calling, if the user engages in texting, if the user engages in emailing, if the user engages in the usage of certain prohibited applications on the mobile phone, if the user has certain infractions occur, if certain states of the device occur, and/or if the device has not connected within a defined time period (e.g., a day). An individual user's profile of monitored or prohibited functions may be selectively defined or include pre-defined profiles, such as no use, limited use with the telephone, or limited use without the telephone. The user profile is defined in the mobile phone application settings and will automatically apply those settings when the mobile phone application is activated and the mobile phone 55 is connected to the device 5.

In certain embodiments, the mobile phone application may include functionality to sense the speed of the mobile phone and monitor or prevent the user from performing the prohibited functions only when the speed exceeds a defined value, for example fifteen miles per hour. Vehicle speed may be determined using GPS technology of the mobile phone. This optional speed check feature allows the user to request that the mobile phone application determine whether the user is traveling under the defined speed threshold by having the user initiate a speed check through the mobile phone application interface. A user would initiate the speed check if the user would like to use the full functionality of the mobile phone when the vehicle is stopped, such as at a stoplight, stop sign, or waiting in a parking lot. The speed check will utilize the GPS technology embedded in the mobile phone. Such GPS technology and methods for monitoring the same are well known within the art. When the user initiates the speed check, then the GPS of the mobile phone will determine if the mobile phone is moving over the speed threshold. If the vehicle is under the speed threshold, then full functionality of the mobile phone will be allowed until the mobile phone reaches the speed threshold again (e.g., the user is initially stopped at a stoplight, the user initiates the speed check and is allowed to use the full functionality of the mobile phone as the mobile phone is under the speed threshold; the light then turns green, and the user begins to drive; once the mobile phone reaches the speed threshold, then the mobile phone functionality will be limited again). Engaging GPS technology on a mobile phone causes significant battery drain of the mobile phone. Thus, a significant advantage of only using the mobile phone's GPS for limited amounts of time during the trip is that the mobile phone application will not constantly use the mobile phone's GPS technology, thereby minimizing the drain on the mobile phone's battery.

In certain embodiments, the mobile phone application may include functionality to sense when the mobile phone is in motion and to monitor or prevent the user from performing the prohibited functions only when the mobile phone is in motion. This mobile phone sensor technology may determine motion of the mobile phone by using the mobile phone's accelerometer, the mobile phone's gyroscope, and/or the mobile phone's magnetometer. In certain embodiments, this optional mobile phone sensor technology feature allows the user to request, through the mobile phone application interface, that the mobile phone sensor technology determine whether the mobile phone is in motion. Functions in several operating systems include the ability to have a mobile phone application utilize data from the mobile phone's accelerometer, the mobile phone's gyroscope, and/or the mobile phone's magnetometer. By using this data, the mobile phone application can determine if the mobile phone is in motion. A user could be provided full functionality of the mobile phone when the vehicle is not in motion, such as at a stoplight, stop sign, or waiting in a parking lot. This optional feature would utilize the sensor technology embedded in the mobile phone. Such sensor technology and methods for monitoring the same are well known within the art. The sensors on the mobile phone will determine if the mobile phone is in motion. If the vehicle is not in motion, then full functionality of the mobile phone will be allowed until the mobile phone is in motion again (e.g., the user stops at a stoplight, the sensor technology determines the mobile phone is not in motion, full functionality of the mobile phone is provided as the mobile phone is not moving; the light then turns green, and the user begins to drive; once the mobile phone is moving again, then the mobile phone functionality will be limited again).

When the mobile phone application is connected with the device, the mobile phone application will also monitor or prevent the mobile phone for such functionality as telephone calling, texting, emailing, using certain prohibited applications on the mobile phone, and/or other infractions, and will store such information on the mobile phone application and/or transmit the data to the device. In some embodiments, certain mobile phone operating systems will allow a user or administrator to both i) monitor mobile phone usage, and/or ii) prevent mobile phone usage. FIG. 2 is a graphical illustration of a computer screen showing the user records of the mobile phone application as seen by an administrator or user for a 7 day or 1 week period with the user's mobile phone application configured to monitor mobile phone usage. If monitoring of mobile phone usage is utilized, the user's usage of the mobile phone applications is monitored when the user is engaging in telephone calling, texting, emailing, and/or using certain prohibited applications on the mobile phone. FIG. 5 is a graphical illustration of a computer screen showing the user records of the mobile phone application as seen by an administrator or user for a 7 day or 1 week period with the user's mobile phone application configured to prevent mobile phone usage. When the user's mobile phone application is configured to prevent mobile phone usage, then the mobile phone application can completely prevent the user from engaging in telephone calling, texting, emailing, and/or using certain prohibited applications on the mobile phone. Certain mobile phone operating systems may allow a user or administrator only to monitor mobile phone usage, but not to prevent mobile phone usage; in addition, monitoring on such operating systems may be more limited. If a user exits the application while driving (i.e., while the device is in the "connected" state, as further described below), then the device may create an audible alarm and/or visual alarm to alert the user to return to the mobile phone application, as previously discussed. Such an audible alarm and/or visual alarm may help serve as a reminder not to engage in these behaviors. In some embodiments, if either the monitor mobile phone usage, or prevent mobile phone usage functionality of the mobile phone application is utilized, then the mobile phone application will also monitor for other infractions. User profile options in the mobile phone application settings regarding i) potential features available to limit or prevent mobile phone functionality that an administrator or user can choose from, and ii) potential pre-defined profiles available to limit or prevent mobile phone functionality are further described below. In certain embodiments, depending on the operating system of the mobile phone, the user and/or administrator will be able to either a) both monitor mobile phone usage and prevent mobile phone usage, or b) only monitor mobile phone usage, which could affect the i) potential features available to limit or prevent mobile phone functionality that an administrator or user can choose from, and ii) potential pre-defined profiles available to limit or prevent mobile phone functionality.

In certain embodiments, the user profile settings of the mobile phone application allow the administrator and/or user to select which mobile phone features are available to a user (i.e., features that are not prohibited) when the device and the mobile phone application are connected. FIG. 9 provides a high level overview of potential features that are available to be selected by the administrator and/or user. The ability to select features allows the administrator or user to determine which mobile phone functions will be monitored or prevented and which mobile phone functions will be allowed when the mobile phone application of the user is connected to the device. The administrator or user can determine if the speed check feature and/or mobile phone sensor technology is available, if the user can engage in telephone usage, and which applications are allowed to be used. However, these functions will be available when the mobile phone application is not connected to the device or if the mobile phone is determined to be below the speed threshold through the user initiated speed check, if the speed check feature has been made available by the user and/or administrator. Alternatively, if the mobile phone sensor technology feature has been made available by the user and/or administrator, these functions will be available when the mobile phone is not in motion as determined by the mobile phone sensor technology.

In another embodiment, the administrator and/or user will only be able to select from pre-defined profiles available for the user's profile in the settings on the mobile phone application. An individual user's pre-defined profile of prohibited functions may include, for example, i) no use of any mobile phone functions while the device and the mobile phone application are connected, ii) limited use of mobile phone functions and no use of telephone calling while the device and the mobile phone application are connected, or iii) limited use of mobile phone functions and with use of the telephone calling while the device and the mobile phone application are connected. FIG. 10 provides a high level overview of potential pre-defined profiles available for a user's profile. The pre-defined profiles are provided in order to reduce confusion experienced by a user or administrator when setting up a user profile. Additionally, the pre-defined profiles improve comparability of scoring between users when these users join groups or have a network of friends as further described herein. When the pre-defined profile for no use of any mobile phone functions is selected, then the mobile phone application will monitor or prevent all functions on the mobile phone, including texting, emailing, voice calling (except 911), and/or using most applications on the mobile phone, except a limited number of pre-defined driver necessary applications, such as mapping applications. However, these functions will be available when the device and the mobile phone application are not connected or if the mobile phone is determined to be below the speed threshold through the user-initiated speed check, if the speed check feature has been made available by the user and/or administrator. Alternatively, if the mobile phone sensor technology feature has been made available by the user and/or administrator, these functions will be available when the mobile phone is not in motion as determined by the mobile phone sensor technology. When the pre-defined profile for limited use of mobile phone functions and no use of the telephone for a voice call while driving is selected, then the user can use pre-defined applications, such as mapping and applications for music. The user will be monitored or prevented from texting, emailing, using certain prohibited applications, and/or making or receiving voice calls in this mode. However, these functions will be available when the device and the mobile phone application are not connected or if the mobile phone is determined to be below the speed threshold through the user-initiated speed check, if the speed check feature has been made available by the user and/or administrator. Alternatively, if the mobile phone sensor technology feature has been made available by the user and/or administrator, these functions will be available when the mobile phone is not in motion as determined by the mobile phone sensor technology. When the pre-defined profile for limited use of mobile phone functions and allowed use of the telephone for voice calling while driving is selected, then the user can use pre-defined applications, such as mapping and applications for music. The user will be monitored or prevented from texting, emailing, and/or using certain prohibited applications, but can make and receive voice calls in this mode. However, these functions will be available when the device and the mobile phone application are not connected or if the mobile phone is determined to be below the speed threshold through the user-initiated speed check, if the speed check feature has been made available by the user and/or administrator. Alternatively, if the mobile phone sensor technology feature has been made available by the user and/or administrator, these functions will be available when the mobile phone is not in motion as determined by the mobile phone sensor technology.

In some embodiments, automatic answering can be enabled for incoming telephone calls, emails, and/or text messages to the mobile phone. For example, incoming telephone calls may be answered with a message that the user of the mobile phone is currently driving and will respond to the telephone call when he or she is available. The caller may choose to leave a voice message. Similarly, an incoming email may be answered with an automatic return email that the user is driving and will respond when he or she is available. Likewise, an incoming text message may be answered with an automatic return text message that the user is driving and will respond when he or she is available.

In certain embodiments, the mobile phone application will have two types of entitlements, i) administrators, and ii) users. The following examples of administrator entitlements are meant to provide some examples of administrator abilities, and are not an exhaustive list. As previously discussed, the administrator may, through the user's profile in the settings for the mobile phone application, control which functions of the mobile phone are monitored or prevented when the device and mobile phone application are connected. The administrator may be able to choose, in the user profile settings of the mobile phone application, which potential features and mobile phone functions are monitored or prevented when the mobile phone application and device are connected, as shown in FIG. 9. The administrator may be able to choose in the settings which pre-defined profiles are applied to the user's profile when the mobile phone application and device are connected, as shown in FIG. 10. In addition, the administrator may disable the "off" state functionality, as defined below, of the device. The reason for this is that the "off" state functionality is intended as the device's state when the device is being stored, but a user could attempt to provide a false reading of the device's state by putting the device in "off" when in the fact the device is not being stored. Therefore, an administrator may want to prevent such a false reading from occurring due to a user's behavior. Upon review of the device's stored information, an administrator reasonably familiar with the user's expected driving patterns could possibly detect such behavior. The administrator may monitor the amount of time for which the audible alarm and/or visual alarm are triggered. The administrator may select when to receive notifications about the user, such as if the user violates certain protocols, if the user engages in telephone calling, if the user engages in texting, if the user engages in emailing, if the user engages in using certain prohibited applications on the mobile phone, if the user has certain infractions occur, if certain states of the device occur, and/or if the device has not connected within a defined time period (e.g., a day).

After the user's completion of a vehicle trip, the device 5, through one or more of the vehicle state sensors, determines when the vehicle is turned off, and the mobile phone application registers a completed trip. The device can register when the vehicle is turned off and the completion of the trip through the voltage change method described above, the accelerometer method described above, or the strength of the signal from the short range wireless communication protocol 65. The strength of the signal from the short range wireless communication protocol 65 can be used to determine the position of the mobile phone relative to the device. The strength of the signal from the short range wireless communication protocol 65 can be separated in relative distances, such as if the mobile phone is close in range to the device, if the mobile phone is medium in range to the device, or if the mobile phone is far in range to the device. By determining if the mobile phone moves from close in range to far in range, then the completion of a trip could also be monitored. For example, a user would be in the driver seat of a vehicle prior to turning off the vehicle, and thus the mobile phone and device would be close in range; after the user completes a trip and turns off the vehicle, then the user exits the vehicle with the mobile phone 55 and the strength of signal from the short range wireless communication protocol 65 declines, declining from medium in range to far in range as the user walks away from the vehicle. In certain embodiments, after completion of a trip, the connection between the device 5 and the mobile phone 55 will terminate and the device 5 will transmit data to the mobile phone 55. When a mobile phone moves from far in range to close in range relative to the device, the strength of the signal from the short range wireless communication protocol 65 can also be detected, serving as an alternative or additional method for determining that a vehicle is turned on.

In some embodiments, the device can register completion of a trip through a combination of one or more of i) the voltage change method described above, ii) the accelerometer method described above, and/or iii) the strength of the signal from the short range wireless communication protocol 65 described above. Additionally, the device may have a setting in which a user can select to hear an audible alarm and/or visual alarm, or receive an alert via the mobile phone, at the completion of a trip to serve as a reminder for other purposes. This feature has many useful applications, for example, alerting the user could remind him or her that a baby is in the back of the vehicle, particularly during hot summer months. Or, for example, the alarm could be useful in vehicles that use a keyless fob, which does not require a physical key to be inserted into the vehicle ignition switch, for alerting the driver that the trip is complete so that the engine does not continue to run and emit carbon monoxide, particularly in the garage of a house, after the driver exits the vehicle.

The status indicator light 30 on the device 5 can indicate a plurality of device states. A flow chart illustrating an exemplifying, non-limiting determination of the device state and the corresponding operation of the status indicator light is shown in FIG. 6. The status indicator light may indicate an "on" state, e.g., by illuminating as a green light. In certain embodiments, the green illuminating light will turn off after a certain period of time to reduce power use. The "on" state indicates that the device is engaged with the vehicle accessory port. The device has not been turned to the "off" state, nor have any the conditions been met to cause a "disengaged" state. The device will track the total time, e.g., in minutes, which the device remains in an "on" state, storing this information in the device. Such tracking is particularly important to a device that functions by engaging with the vehicle accessory port, as the device could be readily removed from the vehicle accessory port, allowing a user to circumvent compliance with the system and device by simply removing it from the vehicle accessory port.

The status indicator light 30 may indicate a "connected" state, e.g., by illuminating as a green light. In certain embodiments, the status indicator light will turn off after a certain period of time to reduce power use. The "connected" state is initiated when the mobile phone application is connected to the device. In order to enter a "connected" state, the device must first be in an "on" state. When the "connected" state occurs, the device and the mobile phone application are connected, and the mobile phone application is used to monitor, control, and/or prevent usage of certain features of the mobile phone while the user is driving. The device remains in the "connected" state any time while the user has connected the mobile phone application to the device when driving. The device will track the total time, e.g., in minutes, which the mobile phone application and device remain in a "connected" state and count the number of times that the device and mobile phone application connect, storing this information in the device. To receive credit for the total time in a "connected" state and the number of times that the device and mobile phone application connect, it may be necessary for the vehicle to be on for a minimum amount of time, such as 2 minutes.

The status indicator light 30 may also indicate the "disengaged" state, in which the status indicator light 30 visually differs from the "on" and "connected" states, e.g., by illuminating as a red light. In certain embodiments, the red illuminating light will turn off after a certain period of time to reduce power use. The "disengaged" state may be triggered by the device 5 being physically removed from the vehicle accessory port without being turned to the "off" state by the user via the mobile phone application. If the status indicator light 30 shows the "disengaged" state, the device must be reset by the user. In certain embodiments, to reset the device, the device must be connected to the mobile phone application and the user must, through the user interface, acknowledge the device reset. After the device is reset, the status indicator light 30 will return to the "on" state. The device will track the total time, e.g., in minutes, that the device remains in a "disengaged" state and count the number of times that the "disengaged" state occurs, storing this information in the device.

The status indicator light 30 may also indicate an "off" state for the device, e.g., by illuminating as a yellow light. In certain embodiments, the yellow illuminating light will turn off after a certain period of time to reduce power use. The "off" state is triggered when the device has been turned off through the user interface of the mobile phone application by the user. The "off" state may be requested by the user, and is particularly useful at certain times, e.g., to store the device between trips or when warming up the vehicle in the winter. If the status indicator light 30 shows the "off" state, the device must be reset by the user. To reset the device, the device must be connected to the mobile phone application and the user must, through the user interface, acknowledge the device reset. After the device is reset, the status indicator light 30 will return to the "on" state. The administrator may disable the "off" state functionality for the user. The device will track the total time, e.g., in minutes, that the device remains in an "off" state and count the number of times that the "off" state occurs, storing this information in the device.

The device automatically logs the number of times the device is in each state and the total amount of time the device is in each state. As such, the device will track the total time that the device remains in each state and count the number of times that the device remains in each state, storing this information in the device. Thus, the device can account for the device state at all times. The device can also record the amount of time in which the audible alarm and/or visual alarm on the device is triggered. The mobile phone application can record the amount of time that certain functions of the mobile phone are being used, such as time spent on telephone calling, texting, emailing, using certain prohibited applications on the mobile phone, and/or other infractions. Every time the device connects or completes a trip, the data for the time the device has spent in each state and the count of times the device was in each state as well as the count and time that the audible alarm and/or visual alarm were on are transmitted to the mobile phone application, which then transmits the data to a remote storage database. Thus, in certain embodiments, a user or the administrator may be able to receive feedback on a user's recent trip soon after the trip is completed. However, after a trip is completed and prior to the next trip, if the device is in an "on" state, "off" state, or "disengaged" state, then the data stored during this period in the device will be transferred to the mobile phone application the next time that the device connects to the mobile phone application; this is generally necessary as the mobile phone application and device must connect to transfer the data. The "on" and "connected" states are generally associated with a positive behavior (i.e., the user is complying with the expected behaviors in using the device). The "disengaged" state is generally associated with a negative behavior of the user physically removing the device from the vehicle accessory port without being turned to the "off" state by the user via the mobile phone application. The "off" state is used to stow the device between trips, but this functionality may be disabled by an administrator as it could lead to cheating as described above. Users and administrators can then access and view that data through the mobile phone application interface, as illustrated in FIGS. 2, 3, 4, and 5. FIGS. 2, 3, 4, and 5 are graphical illustrations of a computer screen showing the user records of the mobile phone application as seen by an administrator or user. FIGS. 2, 3, and 5 illustrate the ability to track and monitor the total time in each state based on different views of durations of time. FIGS. 2 and 3 illustrate the ability to monitor telephone calling, texting, emailing, using certain prohibited applications on the mobile phone, and/or other infractions.

FIG. 4 is an illustration of the mobile phone application interface showing data for a group of users that is utilizing the device and mobile phone application to monitor themselves. The viewable records provide transparency and monitoring capabilities for each user's mobile phone usage while driving. Certain views may be only available to administrators. A group could help its members track their own compliance and apply social or peer pressure for other members not to engage in distracted driving. In certain embodiments, users may invite other users as a friend, and the friend will be able to see the scoring and have transparency into the user's behaviors. Similarly, the user may have transparency into the scoring of the friends in his or her network. The scoring system encourages social pressure and individual monitoring to improve driver behavior. The mobile phone application allows users to join groups or connect with friends to improve on their driving behaviors together. Users may also join challenges or campaigns in which users may compete to achieve a certain goal or goals during a defined time period. Through the tracking functionality, full transparency is provided into the driver's behaviors regarding their compliance with the distracted driving solution, and then out to members of groups or networks of friends, and potentially the broader public. By having full transparency, other users that interact with a certain driver may decide to attempt to alter the behavior of the driver. For example, a father may decide to limit his son's use of the vehicle if the son continues to engage in distracted driving or a group of parents that carpool together may not invite another parent to be in the carpool if he or she continues to engage in distracted driving. The groups and friends allow significant benefits of providing incentives and social pressure to help reduce distracted driving. The scoring also provides positive reinforcement to the user for his or her improvement, similarly to other mobile phone applications synced with performance devices, such as fitness applications.

The scoring system illustrated in FIG. 4 utilizes the data from the device indicating the number of times the device is in each state and the total amount of time the device is in each state as well as the count and time that the audible alarm and/or visual alarm are on. As such, the scoring system utilizes the device's tracking of the total amount time that the device remains in each state and counting of the number of times that the device is in each state, storing this information in the device. The scoring system also takes into account the user's behaviors with his or her mobile phone while driving, such as telephone calling, texting, emailing, using certain prohibited applications on the mobile phone, and/or other infractions. The scoring can provide a consistent metric with views available over periods of time, such as ranging from a day to a year. The scoring can create a uniform mechanism to compare drivers. The scoring mechanism can also help users to set goals, such as reducing telephone usage while driving (assuming this feature has been available to the user), in order to reduce overall distracted driving. Setting goals (and receiving feedback on how well an individual is performing against such goals) is often used in self-help devices, such as fitness devices and CPAP (continuous positive airway pressure) devices. Mobile phone applications are increasingly used to track and share with others an individual's performance on a device. Scoring mechanisms reward users for engaging in safe positive behaviors while penalizing negative behaviors. Users are rewarded for leaving the device in the vehicle accessory port and connecting the device and mobile phone application to monitor or prevent mobile phone functionality (when the device is in the "on" and/or "connected" state). A user is penalized for time that the device is in the "disengaged" state. A user is neither rewarded nor penalized when the device is in the "off" state. "Alarm #/Mins" can measure the number of times the alarm was triggered and the time that the alarm was on. "Telephone Call #/Mins" can measure the number of telephone calls and the time of telephone usage (telephone usage can be monitored or prevented based on the user's profiles). "Text #" can measure the number of texts (texts can be monitored or prevented based on the user's profiles). "Email #/Mins" can measure the number of emails and the time spent in the email application (emails can be monitored or prevented depending based the user's profiles). "Prohibited Apps #/Mins" can measure the number of prohibited applications utilized on the mobile phone, the number of times such applications are utilized, and the time that the users spent in these prohibited applications on the mobile phone (prohibited applications can be monitored or prevented depending based the user's profiles). "Other Infractions" can measure if a trip was completed without the user connecting the device to the mobile phone application, if a user attempts to circumvent certain specified protocols (such as if the user does not connect the device and the mobile phone application when the vehicle turns on, if the user exits the mobile phone application while driving, if the user stops the connection between the mobile phone application and the device while driving, if the user puts the mobile phone application in the background of the mobile phone while driving, and/or if the user engages in certain prohibited mobile phone functions while driving), or if a user is not complying with their personal goals. For example, a user may set a goal to limit mobile phone usage to less than 25% of the time while driving. By monitoring the amount of time the user is engaging in voice telephone calling while connected during an individual trip, the mobile phone application and device can determine if the other infraction has occurred. Of course, the user may choose to leave the mobile phone application alone while driving and not interact with the mobile phone, thus remaining in the system's mobile phone application during the entire trip. With the scoring, views are provided of different periods of time. For example, views are available to see the results over a day, a week, a month, a 6 month period, or a year. The user and the administrator can see views of every different period of time to see progress over periods or to analyze certain trends in behavior.

The scoring system illustrated in FIG. 3 shows the total time that the device is "on" in an illustrative example. For example, a user that leaves the device "on" for 24 hours a day will have the device "on" for 1,440 minutes a day (60 minutes×24 hours); a user that leaves the device "on" for 24 hours a day for 7 days a week will have the device "on" for 10,080 minutes a week (60 minutes×24 hours×7 days). If the device is "off" or "disengaged," then this data will be stored in the device and eventually transmitted to the mobile phone application. The total minutes in a given day is 1,440 minutes, which will be recorded in the "on," "off," and "disengaged" states. The "connected" state is the total time when the mobile phone application and device are connected and overlaps with the "on" state. The alarm, telephone calling, texting, emailing, using certain prohibited applications on the mobile phone, and/or other infractions can also be monitored, with appropriate scoring deductions applied for engaging in such behavior. If a user leaves the device in the "on" state and connects the mobile phone to the device every time that the user is driving in a given day, does not trigger the alarm, does not use the telephone, does not text, does not email, does not use any prohibited applications, and does not have any other infractions, then the user will receive 100 points a day. By using 100 points a day for such a behavior, a user is neither rewarded nor penalized for the total number of trips completed in a given day, but instead the user is rewarded for always complying with the distracted driving solution throughout the day.

It will therefore be readily understood by those persons skilled in the art that the present invention is susceptible to broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications, and equivalent arrangements.

What is claimed is:

1. A system for monitoring and recording use of one or more of a plurality of functions of a mobile phone of a user when the user is in a vehicle, the system comprising:
   a device for engaging in an accessory port of the vehicle, wherein the device comprises one or more vehicle state sensors comprising one or more of a voltmeter and an accelerometer, a wireless transmitter, and a microchip configured to receive and store data; and
   the mobile phone of the user, wherein the mobile phone comprises a wireless receiver and driver monitoring software, and wherein:
   the one or more vehicle state sensors sense data used to determine a vehicle state;
   the vehicle state is one of an ON state and an OFF state;
   the wireless transmitter communicates the vehicle state to the mobile phone and the wireless receiver receives the vehicle state;
   the driver monitoring software is activated when the mobile phone is in wireless communication with the device such that the driver monitoring software monitors and records use of one or more of: (i) the one or more of the plurality of functions or (ii) prescribed protocols of the mobile phone while the vehicle is in the ON state, wherein the one or more of the plurality of functions comprises one or more of voice calling, texting, using an application, and emailing, and wherein the prescribed protocols include one or more of: connecting the device and the driver monitoring software when the vehicle is turned on, not exiting the driver monitoring software while driving, maintaining the connection between the driver monitoring software and the device while driving, not putting the driver monitoring software in the background of the mobile phone, and not engaging in prohibited mobile phone functions while driving.

2. The system of claim 1, wherein the driver monitoring software further comprises a user profile for the user and the driver monitoring software monitors and records in accordance with settings for the user profile.

3. The system of claim 1, wherein a communication indicating a prohibited function of the mobile phone is viewable by an administrator.

4. The system of claim 1, wherein
   the mobile phone further comprises a GPS sensor; and
   wherein the driver monitoring software determines whether the user is traveling under a defined speed threshold based on data received from the GPS sensor, and wherein the driver monitoring software enables use of a prohibited function based on determining that the user is traveling under the defined speed threshold.

5. The system of claim 1, wherein
   the mobile phone generates mobile phone motion data; and
   wherein the driver monitoring software enables use of a prohibited function based on determining that the motion data indicates the mobile phone is not in motion.

6. The system of claim 1, wherein
   the driver monitoring software determines prescribed protocols for the mobile phone; and
   the device further comprises an alarm,
   wherein the alarm is triggered when data received by the device from the driver monitoring software indicates that the user is not complying with the prescribed protocols, and
   the alarm is selected from one or more of an audible alarm and a visual alarm.

7. The system of claim 6, wherein the driver monitoring software further comprises a user profile for the user and the prescribed protocols are determined in accordance with settings for the user profile.

8. The system of claim 1, wherein the driver monitoring software is configured to determine if the user is a driver of the vehicle.

9. The system of claim 8, wherein:
   the device further comprises a unique number for identifying the device;
   the mobile phone further comprises a unique identifier for identifying the mobile phone;
   the wireless transmitter communicates the unique number of the device to the mobile phone via the wireless receiver; and
   the driver monitoring software uses the unique number and the unique identifier to determine if the user is a driver of the vehicle.

10. The system of claim 1, wherein:
    the device has a plurality of device states;
    the driver monitoring software generates a user score based on a number of times and a total amount of time that the device is in each device state of the plurality of device states and usage of the one or more of the plurality of functions of the mobile phone.

11. A system for preventing use of one or more of a plurality of functions of a mobile phone of a user when the user is in a vehicle, the system comprising:
    a device for engaging in an accessory port of the vehicle, wherein the device comprises one or more vehicle state sensors comprising one or more of a voltmeter and an accelerometer, a wireless transmitter, and a microchip configured to receive and store data; and
    the mobile phone of the user, wherein the mobile phone comprises a wireless receiver and driver monitoring software, and wherein:
    the one or more vehicle state sensors sense data used to determine a vehicle state;
    the vehicle state is one of an ON state and an OFF state;
    the wireless transmitter communicates the vehicle state to the mobile phone and the wireless receiver receives the vehicle state;
    the driver monitoring software is activated when the mobile phone is in wireless communication with the device such that the driver monitoring software prevents use of one or more of the plurality of functions of the mobile phone while the vehicle is in the ON state, wherein the one or more of the plurality of functions comprises one or more of voice calling, texting, using a predetermined application, and emailing.

12. The system of claim 11, wherein the driver monitoring software further comprises a user profile for the user and the driver monitoring software prevents one or more of the plurality of functions of the mobile phone in accordance with settings for the user profile.

13. The system of claim 11, wherein a communication indicating a prohibited function of the mobile phone is viewable by an administrator.

14. The system of claim 11, wherein
the mobile phone further comprises a GPS sensor; and
wherein the driver monitoring software determines whether the user is traveling under a defined speed threshold based on data received from the GPS sensor, and wherein the driver monitoring software enables use of a prohibited function based on determining that the user is traveling under the defined speed threshold.

15. The system of claim 11, wherein
the mobile phone generates mobile phone motion data; and
wherein the driver monitoring software enables use of a prohibited function based on determining that the motion data indicates the mobile phone is not in motion.

16. The system of claim 11, wherein
the driver monitoring software determines prescribed protocols for the mobile phone; and
the device further comprises an alarm,
wherein the alarm is triggered when data received by the device from the driver monitoring software indicates that the user is not complying with the prescribed protocols, and the alarm is selected from one or more of an audible alarm and a visual alarm.

17. The system of claim 16, wherein the prescribed protocols include one or more of: connecting the device and the driver monitoring software when the vehicle is turned on, not exiting the driver monitoring software while driving, maintaining the connection between the driver monitoring software and the device while driving, not putting the driver monitoring software in the background of the mobile phone, and not engaging in prohibited mobile phone functions while driving.

18. The system of claim 16, wherein the driver monitoring software further comprises a user profile for the user and the prescribed protocols are determined in accordance with settings for the user profile.

19. The system of claim 11, wherein the driver monitoring software is configured to determine if the user is a driver of the vehicle.

20. The system of claim 19, wherein
the device further comprises a unique number for identifying the device;
the mobile phone further comprises a unique identifier for identifying the mobile phone;
the wireless transmitter communicates the unique number of the device to the mobile phone via the wireless receiver; and
the driver monitoring software uses the unique number and the unique identifier to determine if the user is a driver of the vehicle.

21. The system of claim 11, wherein:
the device has a plurality of device states;
the driver monitoring software generates a user score based on a number of times and a total amount of time that the device is in each device state of the plurality of device states and usage of the one or more of the plurality of functions of the mobile phone.

* * * * *

UNITED STATES PATENT AND TRADEMARK OFFICE
CERTIFICATE OF CORRECTION

| | | |
|---|---|---|
| PATENT NO. | : 10,257,344 B2 | Page 1 of 1 |
| APPLICATION NO. | : 15/133597 | |
| DATED | : April 9, 2019 | |
| INVENTOR(S) | : Stephen Rhyne | |

It is certified that error appears in the above-identified patent and that said Letters Patent is hereby corrected as shown below:

On the Title Page

Add Item (60):
Related U.S. Application Data
Provisional Application No. 62/154,342, filed on April 29, 2015.

Signed and Sealed this
Eleventh Day of June, 2019

Andrei Iancu
*Director of the United States Patent and Trademark Office*